(12) United States Patent
Aravamudan et al.

(10) Patent No.: US 6,396,830 B2
(45) Date of Patent: *May 28, 2002

(54) IMPLEMENTING NETWORK SERVICES OVER THE INTERNET THROUGH DYNAMIC RESOLUTION OF PERSONAL HOST NAMES

(75) Inventors: Murali Aravamudan, Freehold; Venkatesh Krishnaswamy, Holmdel, both of NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,741

(22) Filed: Jun. 18, 1998

(51) Int. Cl.$^7$ ............................................... H04L 12/66
(52) U.S. Cl. ...................................... 370/356; 370/352
(58) Field of Search ................................ 370/351, 352, 370/353, 354, 355, 356, 357; 709/105, 102, 103, 101, 100, 203, 201, 202, 226, 219

(56) References Cited

U.S. PATENT DOCUMENTS

| | | | |
|---|---|---|---|
| 5,951,694 A | * | 9/1999 | Choquier et al. .............. 714/15 |
| 6,078,943 A | * | 6/2000 | Yu ............................... 709/105 |
| 6,175,869 B1 | * | 1/2001 | Ahuja et al. ................. 709/226 |

OTHER PUBLICATIONS

J.B. Postel, "Simple Mail Transfer Protocol," RFC 821, Information Sciences Institute, University of Southern California, Aug. 1982.

P. Mockapetris, "Domain Names—Implementation and Specification," RFC 1035, Information Sciences Institute, University of Southern California, Nov. 1987.

Y. Rekhter, "Interaction Between DHCP and DNS," Internet Draft, draft–ietf–dhc–dhcp–dns–04.tx, May 1997.

Microsoft Active Directory and Active Directory Services Interfaces, http://www.microsoft.com/NTServer/, 2 pages, 1998.

* cited by examiner

*Primary Examiner*—Wellington Chin
*Assistant Examiner*—Brenda Pham
(74) *Attorney, Agent, or Firm*—Ryan, Mason & Lewis, LLP

(57) ABSTRACT

An e-mail message or other communication received over a computer network is processed so as to be directed to a user-designated host server. An Internet service provider or other organization assigns host names to a particular user for each network service provided to that user. Each of the host names specifies a user, a service, e.g., e-mail, homepage and network telephony, and a domain name of the assigning organization. A mapping stored for each host name correlates the host name with an Internet Protocol (IP) address of the user-designated host server for the corresponding service. When an address request for an incoming communication directed to a particular user arrives in a Domain Name System (DNS) server associated with the organization domain, the stored mapping for the corresponding user and service is processed to obtain the appropriate IP address. This address is returned to the requesting DNS server associated with a domain of the sender, and is used to establish a connection between the sender domain and the user-designated host server for delivering the communication. The user-designated host server may be a personal computer associated with the user.

21 Claims, 3 Drawing Sheets

IMPLEMENTING NETWORK SERVICES OVER THE INTERNET THROUGH DYNAMIC RESOLUTION OF PERSONAL HOST NAMES

FIELD OF THE INVENTION

The present invention relates generally to software for controlling communications over computer networks such as the Internet, and more particularly to software which utilizes domain names to direct communications over the networks.

BACKGROUND OF THE INVENTION

In accordance with conventional techniques for processing communications over the Internet, an Internet service provider (ISP), a corporation or another organization is assigned a domain name, e.g., provider.com. Network services associated with the organization, such as e-mail, hypertext transfer protocol (http) requests, file transfer protocol (ftp) requests, and network telephony, are hosted by servers of the organization. Communications addressed to the provider.com domain are resolved using the Domain Name System (DNS) to yield an Internet Protocol (IP) address of a particular host server, e.g., server1.provider.com, within the provider.com domain, and, optionally, a port number on that server. The IP addresses of these servers usually remain fixed for long periods of time. A service name can be specified as part of the domain name and resolved as part of the above-noted DNS process.

FIG. 1 illustrates the implementation of a conventional Internet e-mail service in a computer network. A sender computer 10 includes a mail program 14 which generates an e-mail message addressed to a user associated with a receiver computer 12, e.g., addressed to user@provider.com. The e-mail message is routed by the mail program 14 to a simple mail transfer protocol (SMTP) server 18 associated with an ISP 16 of the sender. The SMTP server 18 utilizes a DNS server 20 of the first ISP to generate a domain name query in order to determine the IP address for a mail server in the domain specified in the e-mail message. The DNS server 20 receives the necessary IP address information from another DNS server 24 associated with an ISP 22 of the receiver computer 12. The DNS server 20 delivers the IP address to the SMTP server 18, and the SMTP server 18 then establishes a connection with the server identified by the IP address, which in this example is assumed to be an SMTP server 26 associated with the ISP 22. The message is then transferred from the SMTP server 18 to the SMTP server 26, and the user accesses the message via a mail program 28 running on the receiver computer 12.

The SMTP servers 18, 26 and DNS servers 20, 24 operate in accordance with standards described in, for example, J. B. Postel, "Simple Mail Transfer Protocol," RFC 821, Information Sciences Institute, University of Southern California, August 1982, and P. Mockapetris, "Domain Names—Implementation and Specification," RFC 1035, Information Sciences Institute, University of Southern California, November 1987, respectively, both of which are incorporated by reference herein.

As described in the above-cited references, conventional Internet e-mail systems based on SMTP utilize either mail exchange binding or mailbox binding. The operation of these two approaches will be illustrated for an e-mail message addressed to user@provider.com. In mail exchange binding, the SMTP server ignores the "user" part of the address and sends DNS queries to obtain the IP address of the host server for the e-mail service, i.e., the SMTP server 26 of ISP 22 in the FIG. 1 example. The SMTP server then establishes an SMTP connection to the returned IP address. In this approach, the DNS server responsible for the domain will typically return the same IP address for all the users of the domain. The mailbox binding approach differs in that it encodes the user@provider.com address into a domain name user.provider.com and then sends DNS queries to obtain an IP address for a corresponding host server. Unfortunately, these and other conventional systems generally do not allow individual users to specify a particular server for processing their incoming e-mail messages.

Host servers for other network services available in the provider.com domain are identified in a similar manner. As in the case of e-mail services, a host server whose IP address is returned by the DNS is typically common to most or all the users within the domain. In other words, the provider.com domain uses the same server or servers to host a particular service for most or all of its users. As a result, e-mail messages addressed to user1@provider.com and user2@provider.com would both be resolved via the DNS process to point to the same e-mail server in the provider.com domain. Individual users in these and other conventional systems are thus generally unable to direct incoming e-mail messages or incoming communications of other services to a particular server of their choosing. Therefore, every user may be required to have their services, such as e-mail, home page, network telephone calls or other services, processed by the same server or servers that everyone else in the organization is using for these services. This can create problems for all of the users if, for example, the designated server or servers for a particular service become overloaded.

SUMMARY OF THE INVENTION

We have recognized that the problems with the prior art can be overcome by employing stored dynamic mappings to direct communications incoming to an Internet service provider (ISP) domain to a user-designated host server. Thus, the present invention allows individual users to specify particular servers for hosting network services provided to those users over computer networks. In an illustrative embodiment, an ISP assigns a personal host name to a particular user for each network service provided to that user. Each of the host names specify (a) the user, (b) a domain name of the ISP, and (c) the service, e.g., e-mail, homepage support, and network telephony. A dynamic mapping stored for each host name correlates the host name with an Internet Protocol (IP) address of a user-designated host server for the corresponding service. Advantageously, this avoids the above-noted problems associated with processing all incoming communications for all users on the same server or servers, and provides users with an ability to customize their network services by altering the mapping in a dynamic manner.

The stored dynamic mappings are used to ensure that incoming communications received in the ISP domain are directed to the appropriate user-designated host server. For example, a user may designate that all incoming e-mail messages directed to that user be processed by an SMTP server running on the user's own personal computer. Alternatively, users may specify different host servers to be used at different times of the day or different days of the week, may direct that all incoming communications automatically be directed to their personal computer as long as it is on and connected to the ISP, or may direct that all incoming communications from particular originating locations be directed to certain host servers.

In accordance with the invention, when an address request for an incoming communication directed to a particular user arrives in a Domain Name System (DNS) server associated with the ISP domain, the stored mapping for the corresponding user and service is retrieved to obtain the appropriate IP address. This address is returned to the requesting DNS server associated with the sender ISP, and is used to establish a connection between the sender ISP and the user-designated host server for delivering the communication. The mapping may be stored in the DNS server associated with the ISP domain. Alternatively, the mapping may be stored in a dynamic location server (DLS) associated with the ISP domain, and retrieved from the DLS by the DNS server upon receipt of an address request in the DNS server. In accordance with an aspect of the invention, the IP address record returned to the requesting DNS in the domain of the sender ISP may be designated as non-cacheable, to insure that the latest dynamic mapping is utilized for each incoming communication.

The invention thus allows e-mail, homepages, network telephony and other network services for a given user to run on particular servers designated by that user. For each service provided within a domain, a different server can be designated to serve each user, and the designated server does not have to be physically located within the domain. Advantageously, the invention can be implemented using existing Internet naming and directory standards.

DETAILED DESCRIPTION OF THE INVENTION

The invention will be illustrated below in conjunction with an exemplary computer network configuration. The invention is particularly well suited for use with network communications which utilize Transmission Control Protocol/Internet Protocol (TCP/IP) connections. The disclosed techniques can also be used with a variety of different types of networks, and with many different types of communications, including e-mail, http requests, ftp requests, network telephony and other standardized and non-standardized services. Any references herein to retrieval of addresses for host servers should be understood to include IP addresses, port numbers, or various combinations of these and other types of address information.

The invention in an illustrative embodiment takes advantage of the widespread deployment of DNS servers across the Internet to provide user-controlled dynamic addressing of host servers for corresponding services within a given domain. It enables each individual user within the domain to choose the particular server that will represent him or her for incoming communications. The invention thus makes it possible to implement customized services for users within the given domain. In the case of e-mail services, for example, the invention allows a user to have a single, permanent e-mail address, regardless of which server happens to host his or her e-mail service at any particular time. Using the techniques of the invention, the user could, for example, control which server hosts his or her e-mail at any given time, based on a number of user-specified criteria such as time of day, on/off or network connection status of a personal computer, originating location of an incoming communication, and so on.

Figure 2:
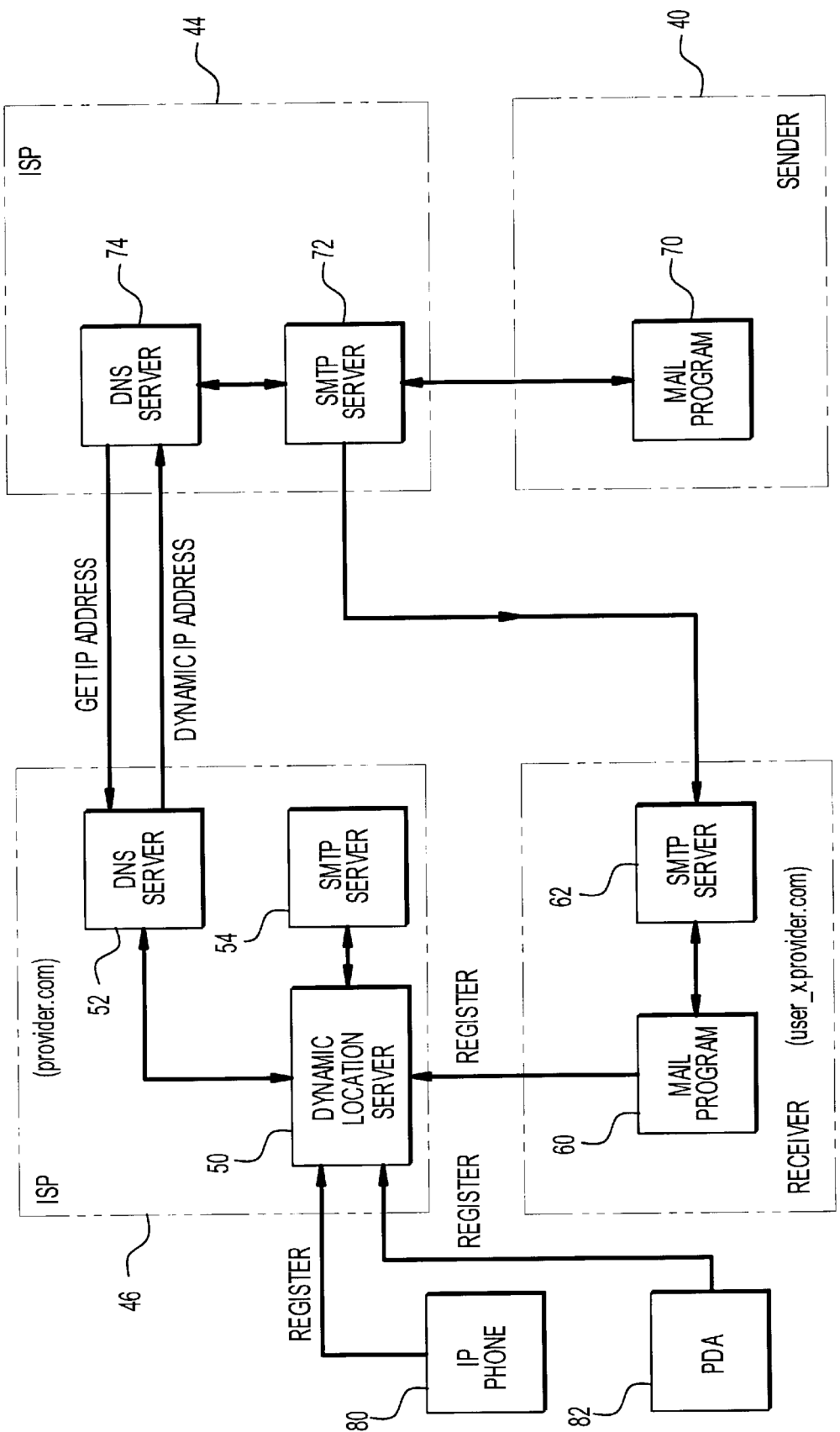
FIG. 2 shows an embodiment of the invention for providing e-mail and other network services in an exemplary computer network.

FIG. 2 shows a computer network configured in accordance with an illustrative embodiment of the invention. The network includes a sender computer 40, a receiver computer 42, a first Internet service provider (ISP) 44 associated with the sender computer 40, and a second ISP 46 associated with the receiver computer 42. The ISP 46 includes a dynamic location server (DLS) 50 coupled to a DNS server 52. As will be described in greater detail below, the DLS 50 processes information regarding a dynamic IP address mapping for the user associated with the receiver computer 42. The receiver computer 42 in this embodiment includes a mail program 60 and an SMTP server 62. The mail program 60 in this embodiment is configured to permit the user of the receiver computer 42 to register with the DLS 50 of the ISP 46. The mail program 60 may thus be viewed as just one possible example of a "registration client" which is permitted to register with the DLS 50. In other embodiments, a single registration client may be used for all transactions with the DLS 50, such that the user can dynamically relocate any network service using a single mechanism. Delinking the registration client from the service in this manner means that the program that actually provides a particular service, e.g., the mail program 60, need not be modified at all. In these other embodiments, the mail program 60 may be any standard mail program used for reading and sending e-mail.

The above-noted registration process may include, for example, a one-time registration which indicates to the DLS that any e-mail addressed to the user is to be directed to the SMTP server 62 on receiver computer 42 as long as the receiver computer 42 is turned on and connected to the ISP 46. The SMTP server 54 in the ISP 46 may be designated as the default host server in the event the receiver computer 42 is not turned on or connected to ISP 46. Alternatively, the registration may involve providing a list of different servers which are to receive e-mail directed to the user at different times of the day, days of the week and so on, or any other suitable user-specified dynamic mapping.

Assume that ISP 46 has the domain name provider.com and the user associated with the receiver computer 42 is designated as user1 and has the domain name user1@provider.com. In accordance with the invention, for each network service that user1 subscribes to, a different host name is assigned. For example, the e-mail service of user1 is identified by the host name email user1.provider.com and the user1 homepage is identified by the host name webpage.user1.provider.com. Other users within the provider.com domain similarly have host names assigned for their e-mail, homepage and other network services. For example, a user designated as user2 can have his or her e-mail and homepage identified by the host names email.user2.provider.com and webpage.user2.provider.com, respectively.

As noted above, the invention allows the actual server hosting the e-mail, homepage or other network service of a particular user to be personally specified by that user. The server hosting a given service, such as e-mail, for user1 can thus be different from the server hosting the same service for user2. Moreover, the host server IP addresses associated with the above-noted host names such as e-mail.user1provider.com and webpage. user1provider.com can vary by time of day or any other criteria specified by user1. The invention can provide similar features for any other network service including, for example, IP phones and other types of network telephony; Thus, an Internet phone number for user1 may be given by the host name ipphone.user1.provider.com. This host name could resolve to an IP address of receiver computer 42 or any other device that is the preferred terminal of user1 for receiving Internet telephone calls.

Figure 1:
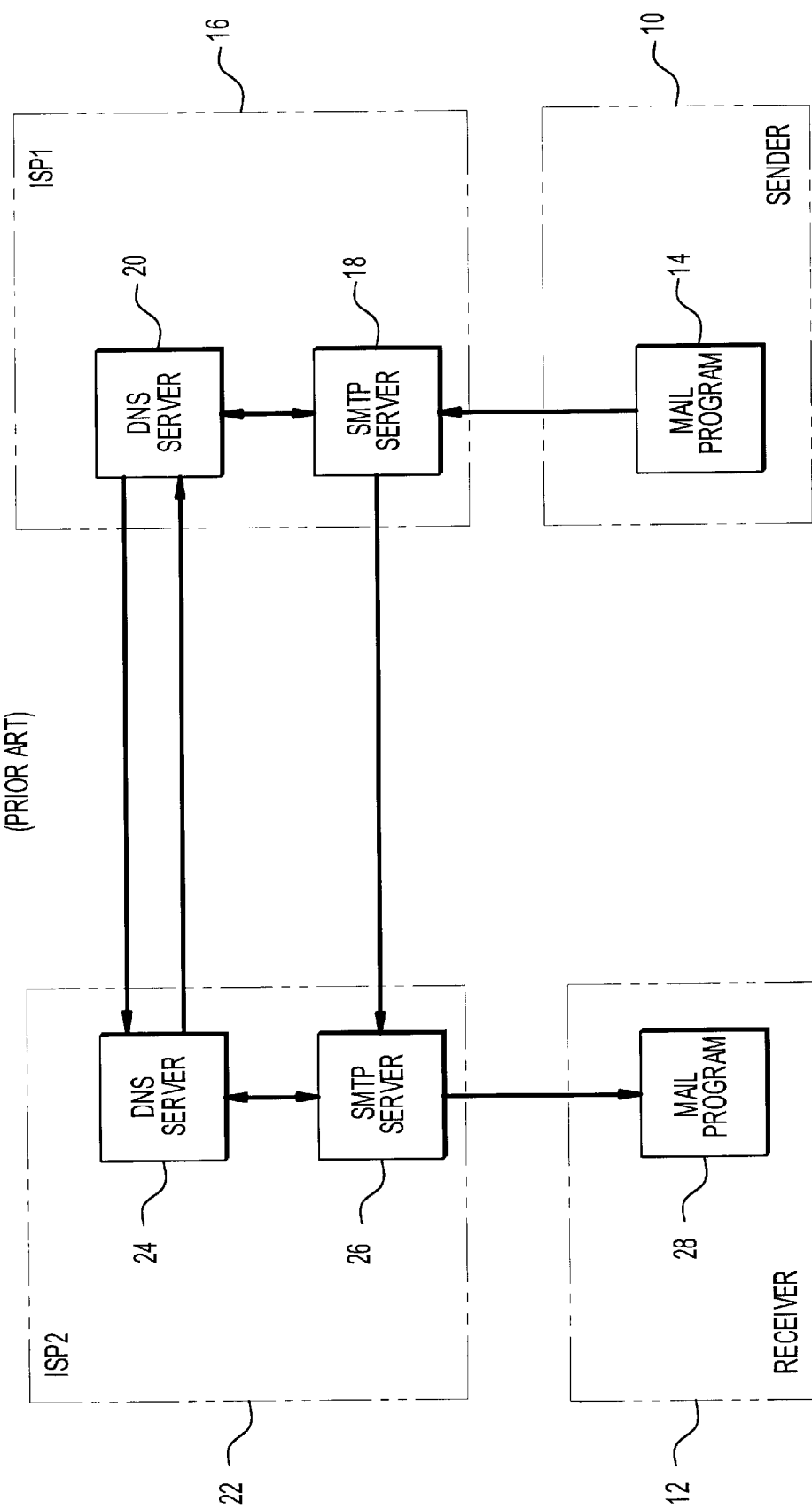
FIG. 1 illustrates e-mail processing in a conventional computer network.

The sender computer 40 and its corresponding ISP 44 in the system of FIG. 2 are both configured in a conventional manner. As in the system of FIG. 1, the sender computer 40 in FIG. 2 includes a mail program 70, and the ISP includes an SMTP server 72 and a DNS server 74. As will become apparent from the following description, an advantage of the network services provided in accordance with the invention is that these services can generally be implemented without any modification to sender-side software or hardware. It should be noted that the elements 40, 42, 44 and 46 are simplified in FIG. 2 for purposes of illustration. These elements may include additional components configured in a known manner. For example, the receiver computer 42 may include other components typically found in a personal computer, such as a microprocessor and various electronic and disk-based memories, as will be illustrated in conjunction with FIG. 4. Moreover, the ISP 46 may include a large number of networked computers as well as other supporting communication equipment generally associated with such providers.

The operation of the DLS 50 in the ISP 46 of FIG. 2 will now be described in greater detail. As shown in FIG. 2, the DLS 50 is coupled to the DNS server 52 in the provider.com domain corresponding to ISP 46. The DLS 50 provides the above-described dynamic mapping between host names and IP addresses within the domainprovider.com. The DLS 50 in this embodiment resolves the host names managed by the DNS server 52 and the IP addresses and port numbers of all the servers for each user within the provider.com domain. When any service belonging to any user within the provider.com domain is relocated to a different IP address or port number, the DLS 50 is notified. Alternatively, the DLS can run programs on behalf of users in order to periodically update the current host server location data based on user-specified criteria. In addition, the DLS 50 may be configured to monitor the on/off status of the receiver computer 42 whenever it is connected to the ISP 46, such that it can determine whether it is appropriate to have a server running on that computer act as a user-designated host server for a network service. Conventional host servers within the ISP 46, such as SMTP server 54, may be used as default hosts in the event the receiver computer 42 is off or disconnected from the ISP 46 but the user has not designated an alternative host.

Dynamic host name resolution in accordance with the invention can be implemented in a number of different ways. For example, the DLS 50 could update a database of host names in the DNS server 74 upon any change in the host address mapping information for any user. This would generally require that the DNS server 52 support a dynamic DNS update protocol such as that outlined in Y. Rekhter, "Interaction Between DHCP and DNS," Internet Draft, draft-ietf-dhc-dhcp-dns-04.tx, May 1997, which is incorporated by reference herein. In one possible embodiment of this implementation, when a user turns on receiver computer 42 and is connected to the ISP 46, an IP address is obtained by the DLS 50 for the computer 42. The DHCP client/server protocol extensions described in the above-cited Internet Draft may then be used to register the host name of a user service with the DLS 50. The DLS 50 in turn supplies the host name to IP address mapping to the DNS server 52 for storage. If the receiver computer 42 supports multiple network services, a separate host name to IP address mapping for each service may be registered and stored in this manner. When the receiver computer 42 is turned off or disconnected from the ISP 46, the mapping may be removed from the DNS server, and/or replaced with a new user-specified mapping at the direction of the DLS 50.

In another implementation of dynamic host name mapping in accordance with the invention, the DNS server 52 queries the DLS 50 rather than a host name database in order to resolve host name queries. The DLS 50 returns a dynamically-mapped IP address which is then forwarded by the DNS server 52 to the requesting DNS server in ISP 44. Other suitable techniques for providing a dynamic mapping of host names to IP addresses of user-designated host servers could also be used. It should be noted that the DNS server 52 may be configured to mark the corresponding record for any dynamic IP address that it sends out as non-cacheable, so that the host name to IP address mapping remains truly dynamic. The DNS server 52 can accomplish this by setting the time to live (TTL) value of the corresponding record to zero, which will in effect instruct other DNS servers not to cache the record.

Figure 3:
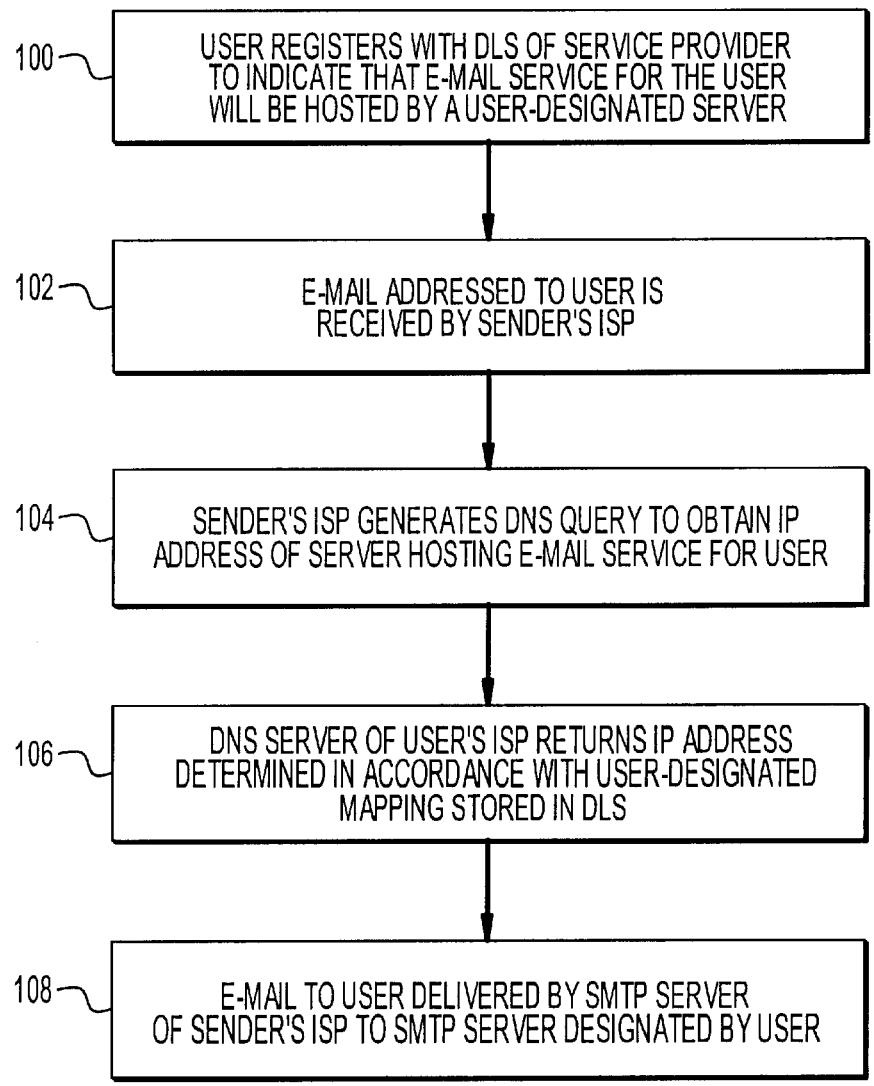
FIG. 3 is a flow diagram illustrating the operation of an e-mail service in accordance with the invention in the embodiment of FIG. 2.

FIG. 3 is a flow diagram illustrating the operation of the computer network of FIG. 2 for the case of processing an e-mail message sent by a user associated with the sender computer 40 to a user associated with the receiver computer 42. In step 100, the user associated with the receiver computer 42 registers with the DLS 50 of the ISP 46. As previously noted, this registration may involve the user specifying a particular server for processing incoming e-mail messages directed to that user. It will be assumed for this example that the user as part of the registration with the DLS indicates that the user would like to have incoming e-mail messages directed to the SMTP server 62 on the receiver computer 42. As previously noted, this server designation may be conditioned on the on/off or connection status of the receiver computer 42, the time of day, the day of the week, or other user-specified conditions.

In step 102, an e-mail message addressed to the user is generated by the mail program 70 of sender computer 40 and is received in the SMTP server 72 of the sender's ISP 44. In step 104, the DNS server 74 in the sender's ISP 44 generates one or more conventional DNS queries to obtain an IP address for the server hosting e-mail services for the user. As part of this process, the DNS server 74 of ISP 44 contacts the DNS server 52 of ISP 46. In step 106, the DNS server 52 in ISP 46 returns an IP address which is determined in accordance with the user-designated mapping stored as part of the above-noted registration process. The DNS server 74 returns this IP address to the SMTP server 72, and the server 72 then establishes a connection with the SMTP server 62 of the receiver computer 42. In step 108, the server 72 uses the connection with server 62 to deliver the e-mail message. The user associated with receiver computer 42 can then access the message in a conventional manner using the mail program 60.

The computer network of FIG. 2 can also support user designation of host servers for network services other than e-mail. For example, each of a number of different devices associated with a particular user can be registered with the DLS 50 of ISP 46. FIG. 2 shows two such devices, an IP telephone device 80 and a personal digital assistant (PDA) 82 that are both associated with the user of the receiver computer 42. The user can register each of the devices 80, 82 with the DLS 50 in a manner similar to that described above for registering the receiver computer 42. For example, the user can specify as part of the registration that any network telephony calls directed to the IP telephone 80 be processed by a host server implemented in the receiver computer 42 or in any other location selected by the user. Similarly, the user can specify that any communications directed to the PDA 82 be processed by a designated host server implemented in the receiver computer 42 or any other location. As in the case of the e-mail service, the designated servers for other devices may also be subject to user-specified conditions.

Figure 4:
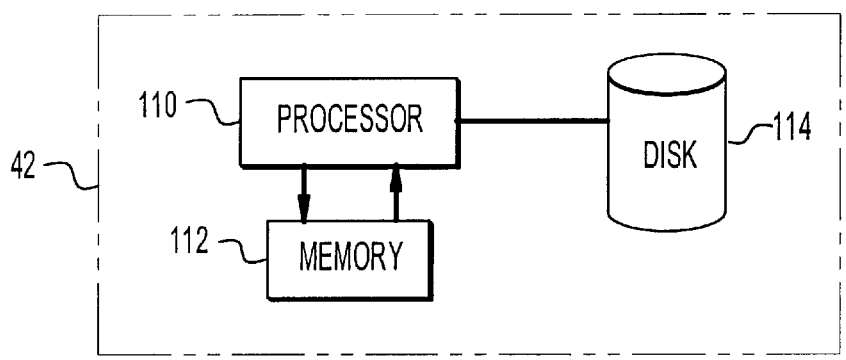
FIG. 4 shows an illustrative implementation of a computer suitable for implementing a portion of the invention in the system of FIG. 2.

FIG. 4 shows an exemplary implementation of the receiver computer 42 of FIG. 2. The receiver 42 in this embodiment is configured in the form of a personal computer which includes a processor 110, an electronic memory 112 and a disk-based memory 114. The processor 112 executes software programs which are stored in the memories 112 and 114 in order to provide the user registration functions, an SMTP server and other processing functions associated with the receiver computer 42 and described in detail above. The user registration functions and SMTP server may, for example, be in the form of one or more software programs provided on a diskette or other computer-readable medium supplied to the user, or may be downloaded as one or more software programs from a software supplier using a conventional network connection. The mail program 60 may represent an otherwise conventional browser program which is modified to include user registration functions. Alternatively, the user registration functions could be provided as a separate stand-alone program or as set of programs. As noted previously, a "registration client" responsible for the registration process may be, for example, a stand-alone program running on a user computer, or a program that is co-located with the DLS and which is accessed by the user through the Internet or other suitable network. In the latter case, the user may register from any computer that is connected to the Internet. It should be noted that one or more computers configured in the manner shown in FIG. 4 may also be used to implement various storage and other processing functions in the ISP 46 of FIG. 2.

The above-described embodiments of the invention are intended to be illustrative only. Alternative embodiments may utilize many different types and arrangements of computer hardware and software to process user communications. For example, although the invention is illustrated using network connections between Internet service providers and their users, the invention can also be applied to groups of computers associated with a corporation or any other type of organization. Furthermore, the invention may be implemented using non-standard communication protocols in place of the DNS, SMTP and other protocols used in the illustrative embodiments. These and numerous other alternative embodiments within the scope of the following claims will be apparent to those skilled in the art.

What is claimed is:

1. A method of processing a communication received over a computer network, the method comprising the steps of:
storing for a given user of the network a mapping between a host name and an address of a user-designated host server for hosting a particular network service provided to that user, wherein the user is one of a plurality of users associated with an organization, and the host name specifies the user and the particular network service; and directing an incoming communication of the network service addressed to the user to the host server specified in the mapping.

2. The method of claim 1 wherein the organization is an Internet service provider.

3. The method of claim 1 wherein the network service includes at least one of an e-mail service, a homepage service, and a network telephony service.

4. The method of claim 1 wherein the user-designated host server is a personal computer associated with the user.

5. The method of claim 1 further including the step of storing information that is used to limit the application of the directing step to incoming communications.

6. The method of claim 5 wherein the information includes a user-designated time period for which an incoming communication received during that time period should be directed to the host server specified in the mapping.

7. The method of claim 1 wherein the storing step further includes storing for the given user of the network a plurality of mappings, with each mapping specifying a host name and an address of a user-designated host server for hosting a particular network service provided to that user, and the directing step further includes directing an incoming communication of the network service addressed to the user to a host server specified in a particular one of the plurality of mappings, wherein the particular one of the mappings selected for use upon receipt of the incoming communication is determined in accordance with at least one user-designated constraint.

8. The method of claim 1 wherein the step of storing a mapping further includes the step of storing the mapping in a record of a Domain Name Service (DNS) server associated with a domain of the user.

9. The method of claim 1 wherein the step of storing a mapping further includes the step of storing the mapping in a non-DNS server associated with a domain of the user, wherein the mapping is supplied from the non-DNS server to a DNS server associated with a domain of the user upon receipt of an address request in the DNS server.

10. The method of claim 1 further including the steps of:
returning a record including an address of the user-designated host server from a DNS server associated with the domain of the user to a requesting DNS server in another domain; and
designating the record as non-cacheable.

11. An apparatus for processing a communication received over a computer network, the apparatus comprising:
a memory for storing for a given user of the network a mapping between a host name and an address of a user-designated host server for hosting a particular network service provided to that user, wherein the user is one of a plurality of users associated with an organization, and the host name specifies the user and the particular network service; and
at least one additional server operative to determine, upon receipt of an incoming communication of the network service addressed to the user, an address of the host server specified in the mapping.

12. The apparatus of claim 11 wherein the organization is an Internet service provider.

13. The apparatus of claim 11 wherein the network service includes at least one of an e-mail service, a homepage service, and a network telephony service.

14. The apparatus of claim 11 wherein the user-designated host server is a personal computer associated with the user.

15. The apparatus of claim 11 wherein the memory further stores information specifying at least one constraint relating to direction of incoming communications to the user-designated host server.

16. The apparatus of claim 15 wherein the constraint includes a user-designated time period for which an incoming communication received during that time period should be directed to the host server specified in the mapping.

17. The apparatus of claim 11 wherein the memory stores for the given user of the network a plurality of mappings, with each mapping specifying a host name and an address of a user-designated host server for hosting a particular network service provided to that user, and wherein the at least one additional server is further operative to direct an incoming communication of the network service addressed to the user to a host server specified in a particular one of the plurality of mappings, and further wherein the particular one of the mappings selected for use upon receipt of the incoming communication is determined in accordance with at least one user-designated constraint.

18. The apparatus of claim 11 wherein the at least one additional server is a Domain Name Service (DNS) server associated with a domain of the user.

19. The apparatus of claim 11 wherein the at least one additional server includes a DNS server and a non-DNS server, both associated with a domain of the user, and wherein the mapping is supplied from the non-DNS server to the DNS server upon receipt of an address request in the DNS server.

20. The apparatus of claim 11 wherein the at least one server is a DNS server associated with a domain of the user, and the DNS server is operative to return a record including an address of the user-designated host server to a requesting DNS server in another domain, and to designate the record as non-cacheable.

21. An apparatus for processing a communication received over a computer network, the apparatus comprising:

means for storing for a given user of the network a mapping between a host name and an address of a user-designated host server for hosting a particular network service provided to that user, wherein the user is one of a plurality of users associated with an organization, and the host name specifies the user and the particular network service; and means for directing an incoming communication of the network service addressed to the user to the host server specified in the mapping.

* * * * *